United States Patent
Lin et al.

(10) Patent No.: US 10,769,341 B1
(45) Date of Patent: Sep. 8, 2020

(54) METHOD OF PLACING MACRO CELLS AND A SIMULATED-EVOLUTION-BASED MACRO REFINEMENT METHOD

(71) Applicants: NCKU Research and Development Foundation, Tainan (TW); Himax Technologies Limited, Tainan (TW)

(72) Inventors: Chia-Min Lin, Tainan (TW); You-Lun Deng, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 16/390,840

(22) Filed: Apr. 22, 2019

(51) Int. Cl.
*G06F 30/392* (2020.01)
*G06F 7/58* (2006.01)

(52) U.S. Cl.
CPC .............. *G06F 30/392* (2020.01); *G06F 7/58* (2013.01)

(58) Field of Classification Search
CPC .................................. G06F 30/392; G06F 7/58
See application file for complete search history.

(56) References Cited

U.S. PATENT DOCUMENTS

| | | | |
|---|---|---|---|
| 2007/0157146 A1* | 7/2007 | Chen | G06F 30/392 257/798 |
| 2011/0239177 A1* | 9/2011 | Chong | G06F 30/392 716/119 |

* cited by examiner

*Primary Examiner* — Vuthe Siek
(74) *Attorney, Agent, or Firm* — Donald E. Stout; Stout, Uxa & Buyan, LLP

(57) ABSTRACT

A simulated-evolution-based macro refinement method includes evaluating a score of each placed macro cell to be refined; generating a random number; determining whether the score satisfies a predetermined condition; placing the macro cell into a queue if the score associated with the macro cell satisfies the predetermined condition; and sorting and placing macro cells of the queue according to scores of the macro cells in the queue.

11 Claims, 4 Drawing Sheets

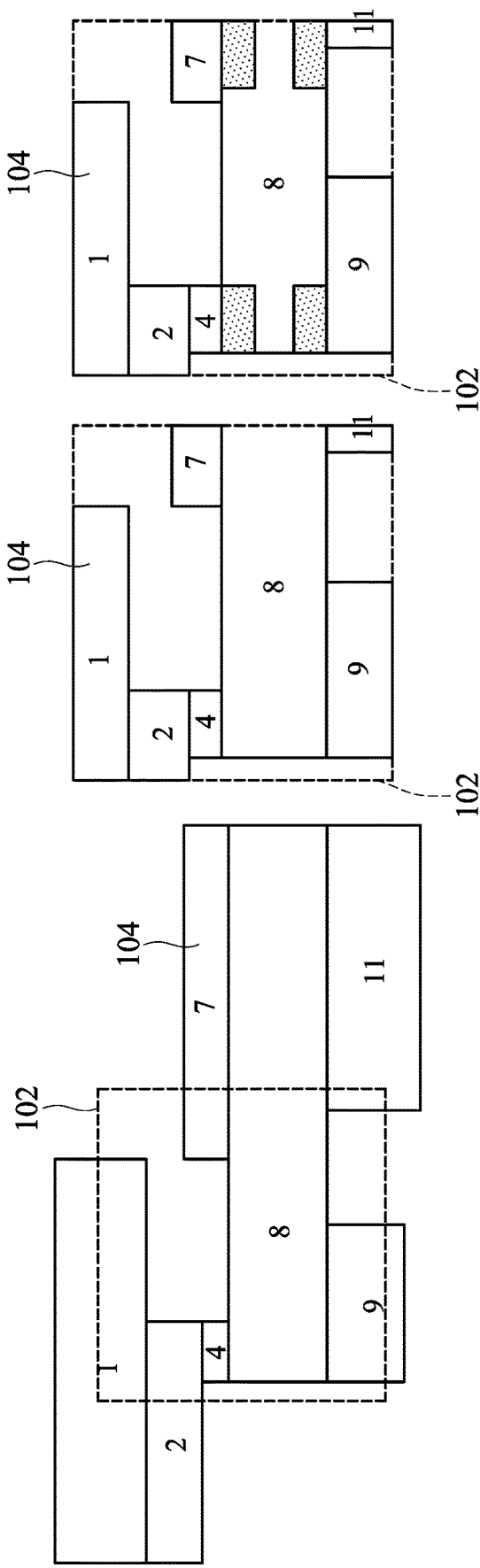

US 10,769,341 B1

METHOD OF PLACING MACRO CELLS AND A SIMULATED-EVOLUTION-BASED MACRO REFINEMENT METHOD

BACKGROUND OF THE INVENTION

1. Field of the Invention

The present invention generally relates to macro placement, and more particularly to a simulated-evolution-based macro refinement method.

2. Description of Related Art

Macro placement has a marked impact on wirelength and routability, and locations of standard cells are greatly affected by the macro placement. As the dimension of the macro is substantially greater than that of the standard cell, the macro placement incurs more complex problem than the standard cell placement. The problem becomes even more serious when several macros are pre-placed as obstacles on a chip. Longer wirelength and serious routing congestion may be induced when macros fail to be placed at desired locations. Therefore, macros are conventionally placed manually by experienced engineers. With the number of macros in a modern system-on-a-chip (SoC) increases dramatically, it is inefficient and ineffective to rely on the experienced engineers to perform large-scale macro placement.

Previous works usually use simulated annealing algorithm to deal with this problem. However, this scheme is quite time-consuming. For the reason that conventional methods could not effectively improve the macro placement, a need has arisen to propose a novel macro placer that can efficiently and effectively place macros.

SUMMARY OF THE INVENTION

In view of the foregoing, it is an object of the embodiment of the present invention to provide a simulated-evolution-based macro refinement method that may be executed faster than conventional methods.

According to one embodiment, a simulated-evolution-based macro refinement method is disclosed. A score of each placed macro cell to be refined is evaluated, and a random number is generated. It is determined whether the score satisfies a predetermined condition. The macro cell is placed into a queue if the score associated with the macro cell satisfies the predetermined condition. Macro cells of the queue are sorted and placed according to scores of the macro cells in the queue.

BRIEF DESCRIPTION OF THE DRAWINGS

FIG. 2A to FIG. 2C show an example executed by the macro legalization method of FIG. 1A.

DETAILED DESCRIPTION OF THE INVENTION

Figure 1A:
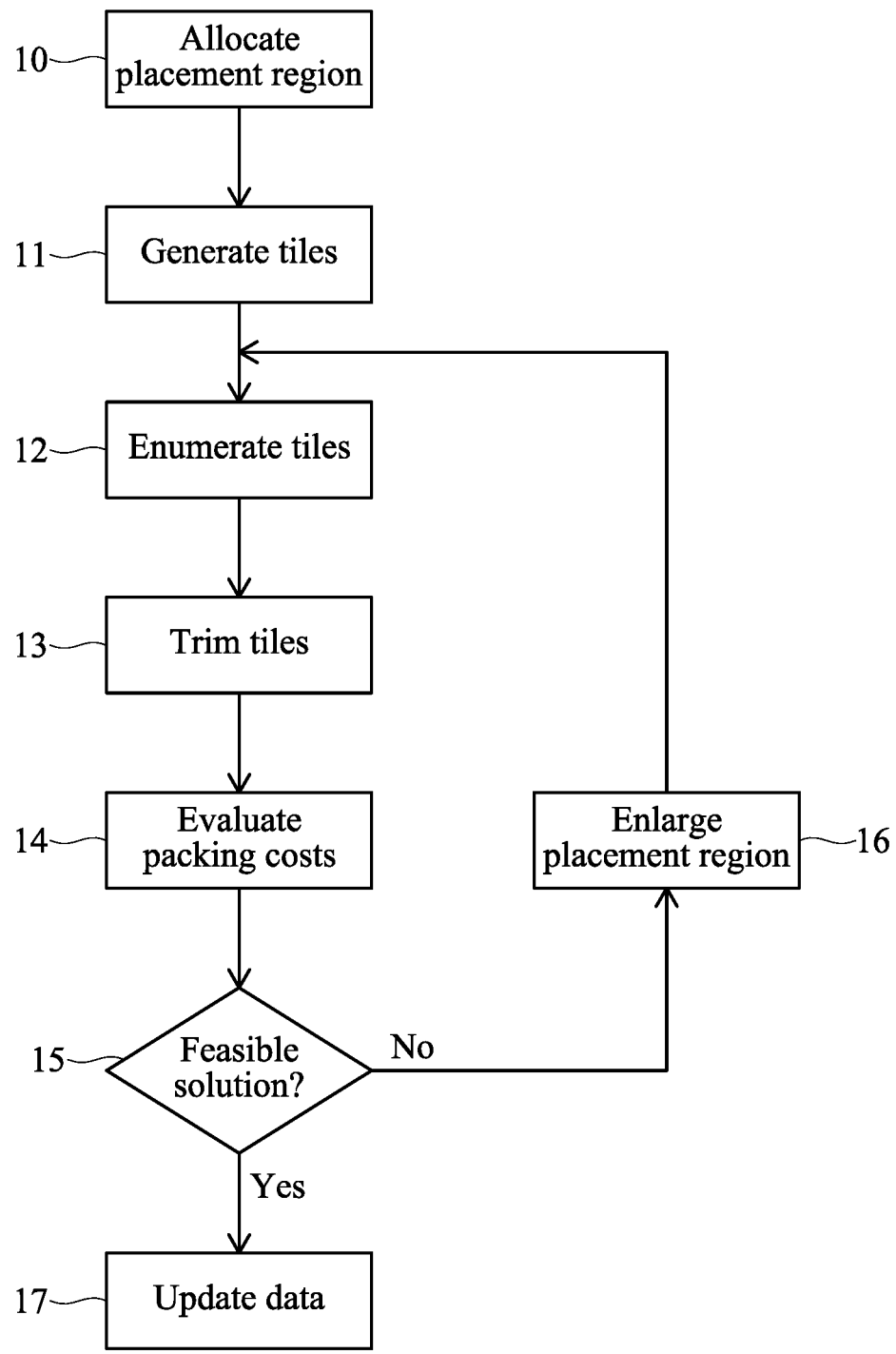
FIG. 1A shows a flow diagram illustrating a corner-stitching-based macro legalization method.
Figure 1B:
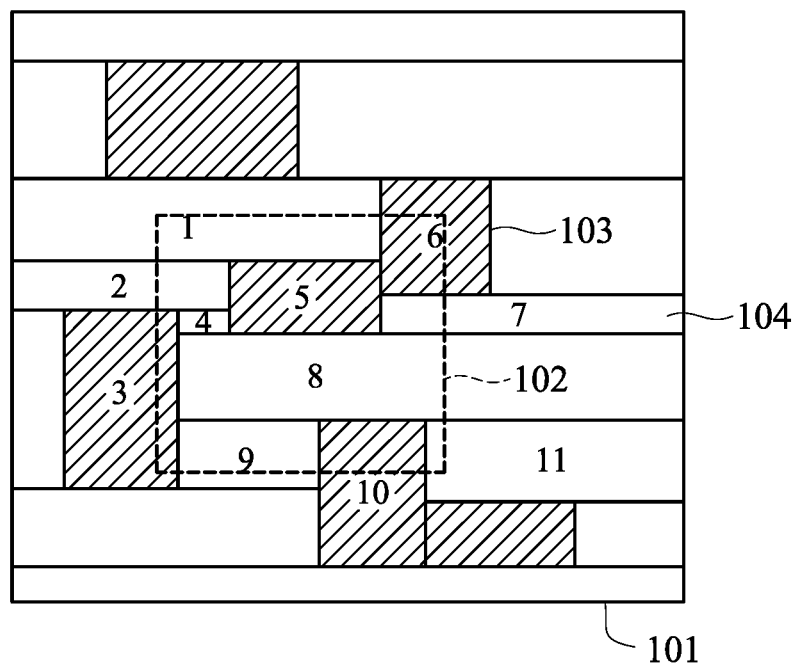
FIG. 1B schematically shows a top view of an exemplary chip, on which macro cells are to be placed.

FIG. 1A shows a flow diagram illustrating a corner-stitching-based macro legalization method 100 ("macro legalization method" hereinafter), and FIG. 1B schematically shows a top view of an exemplary chip (or microchip) 101, on which macro cells are to be placed. FIG. 2A to FIG. 2C show an example executed by the macro legalization method 100 of FIG. 1A. It is appreciated that a macro legalization method other than the macro legalization method 100 (FIG. 1A) may be used instead to initially place macros on a chip 101.

In step 10, a placement region 102 is determined and allocated on a chip 101 for a macro group composed of a plurality of macro cells. In one embodiment, the placement region 102 is determined by recursive partition algorithm. Next, in step 11, a plurality of (rectangular) empty tiles 104 are generated on the chip 101 according to pre-placed cells 103. As exemplified in FIG. 1B, the chip 101 has some pre-placed cells 103 denoted by hatched regions, and has a plurality of (rectangular) empty tiles 104, which occupy empty space not covered by the pre-placed cells 103. The horizontal boundaries of the empty tiles 104 are extended from the horizontal boundaries of adjacent pre-placed cell or cells 103.

Afterwards, steps 12-16 are performed for each macro cell to be placed. In step 12, the tiles 104 within the placement region 102 are enumerated according to corner stitching, details of which may be referred to "Corner Stitching: A Data-Structuring Technique for VLSI Layout Tools," entitled to J. K. Ousterhout, IEEE TCAD, vol. 3, no. 1, pp. 87-100, 1984, the disclosure of which is incorporated herein by reference. As exemplified in FIG. 2A, there are tiles 104 denoted as 1, 2, 4, 7, 8, 9 and 11 within the placement region 102.

In step 13, regions of the tiles 104 exceeding a boundary of the placement region 102 are trimmed (or cut) down as exemplified in FIG. 2B.

In step 14, as exemplified in FIG. 2C, for each tile 104 (e.g., tile 8), the macro cell (denoted by dotted region) to be placed is packed into corners of the (trimmed) tile 104 if a dimension of the macro cell is not greater than the tile 104, and respective packing costs are evaluated. The packing costs are evaluated for all the tiles 104. The macro cell may accordingly be placed at a location associated with a minimum packing cost, and the location may be updated (step 17).

If no tile 104 can accommodate the macro cell (step 15), the placement region 102 is enlarged in step 16, and steps 12-14 are repeated for the enlarged placement region 102.

Figure 3:
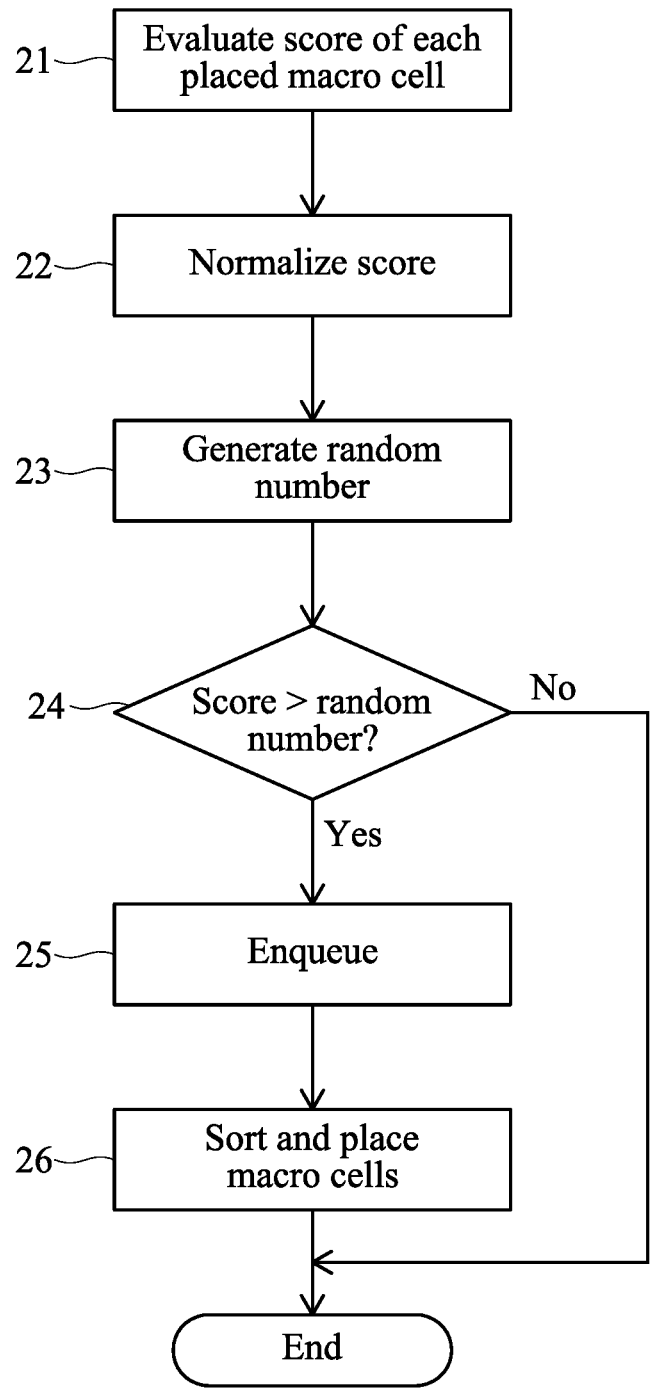
FIG. 3 shows a flow diagram illustrating a simulated-evolution-based macro refinement method according to one embodiment of the present invention.

FIG. 3 shows a flow diagram illustrating a simulated-evolution-based macro refinement method 200 ("macro refinement method" hereinafter) according to one embodiment of the present invention. The macro refinement method 200 may be executed after macro legalization (or packing), for example, performed by the macro legalization method 100 (FIG. 1A).

In step 21, a score of each placed macro cell is evaluated. Next, in step 22, the score is normalized to be in a predetermined range, for example, between 0 and 1, thereby resulting in a normalized score.

In step 23, a random number is generated, and the generated random number is in the same predetermined range, for example, between 0 and 1. Next, in step 24, it is determined whether the score is greater than the generated random number (or, in general, whether the score satisfies a predetermined condition). If a result of step 24 is positive, the macro cell is ripped up and entered a queue (e.g., enqueue) (step 25), followed by sorting and placing macro cells according to normalized scores (step 26); otherwise the flow skips step 25 and step 26. Steps 23-25 are repeated for all the placed macro cells.

In the embodiment, a score function $F_i$ utilized to generate the score mentioned above may be expressed as follows:

$$F_i = \begin{cases} Q & \text{if } D = 0 \\ Q + \dfrac{\lambda}{D*\log(k+1)} & \text{otherwise} \end{cases}$$

$$Q = W + D$$

where D represents distance between the macro cell (to be refined) and gravity of the macro group to which to the macro cell to be refined belongs; D is equal to zero when the macro cell is placed at the gravity as the macro group is composed of only one macro cell; W represents wirelength associated with the macro cell to be refined; $\lambda$ is a user-specified number; and k is a sequence number of iterations for performing the flow of FIG. 3. It is noted that the gravity of the macro group may be determined after each iteration.

According to one aspect of the embodiment, the log function in the second term is used to adjust the score to a larger value such that the predetermined condition (e.g., the score is greater than the generated random number) in step 24 may be satisfied more probably. Since the log function returns a substantially small value that has a dramatic change for the first few iterations k, the distance D has substantial influence on the resulting score when k is small. However, as the sequence number k of iteration increases, the log function returns a large and stable value. Hence, the second term becomes a substantially small value, and the distance D thus has less influence on the resulting score. That is, the larger the sequence number k is, the less influence the distance D has on the resulting score.

Although specific embodiments have been illustrated and described, it will be appreciated by those skilled in the art that various modifications may be made without departing from the scope of the present invention, which is intended to be limited solely by the appended claims.

What is claimed is:

1. A method of placing macro cells, comprising:
   performing corner-stitching-based macro legalization on a macro group composed of macro cells to be placed;
   evaluating a score of each placed macro cell to be refined;
   normalizing the score to be in a predetermined range to result in a normalized score;
   generating a random number, which is in the same predetermined range as the normalized score;
   determining whether the normalized score is greater than the random number;
   placing the macro cell into a queue if the normalized score is greater than the random number; and
   sorting and placing macro cells of the queue according to scores of the macro cells in the queue.

2. The method of claim 1, before the corner-stitching-based macro legalization, further comprising the following steps:
   determining and allocating a placement region on a chip; and
   generating a plurality of empty tiles that occupy empty space not covered by a pre-placed cell.

3. The method of claim 2, wherein the corner-stitching-based macro legalization comprises the following steps:
   enumerating the tiles within the placement region;
   trimming down regions of the tiles exceeding a boundary of the placement region;
   packing the macro cell to be placed into corners of each trimmed tile if a dimension of the macro cell is not greater than the tile;
   evaluating respective packing costs of the macro cell packed in corners; and
   placing the macro cell according to the packing costs.

4. The method of claim 3, further comprising:
   enlarging the placement region if no tile can accommodate the macro cell.

5. The method of claim 2, wherein the placement region is determined by recursive partition algorithm.

6. The method of claim 2, wherein horizontal boundaries of the tiles are extended from horizontal boundaries of adjacent pre-placed cell.

7. The method of claim 1, wherein a score function utilized to generate the score is a function of wirelength associated with the macro cell to be refined, distance between the macro cell to be refined and gravity of a macro group to which to the macro cell to be refined belongs, and a sequence number of iterations for refining the macro group.

8. The method of claim 7, wherein the score function comprises a term used to adjust the score to a larger value such that the normalized score may be greater than the random number more probably.

9. The method of claim 7, wherein the gravity of the macro group is determined after each iteration.

10. The method of claim 7, wherein the larger the sequence number is, the less influence said distance has on the score.

11. The method of claim 7, wherein the score function is expressed as follows:

$$F_i = \begin{cases} Q & \text{if } D = 0 \\ Q + \dfrac{\lambda}{D*\log(k+1)} & \text{otherwise} \end{cases}$$

$$Q = W + D$$

where D represents said distance, W represents the wirelength, $\lambda$ is a user-specified number, k is a sequence number of iterations, and log represents a logarithm function.

* * * * *